Fig. 1

INVENTORS.
Warren J. Schieser
John F. Kelley

March 6, 1956

W. J. SCHIESER ET AL 2,736,922

INJECTION MOLDING MACHINE WITH
AUTOMATICALLY-CONTROLLED
WEIGH-FEEDER

Filed Dec. 24, 1953

INVENTORS.
Warren J. Schieser
John F. Kelley

BY

ATTORNEYS.

March 6, 1956

W. J. SCHIESER ET AL

2,736,922

INJECTION MOLDING MACHINE WITH
AUTOMATICALLY-CONTROLLED
WEIGH-FEEDER

Filed Dec. 24, 1953

INVENTORS.
Warren J. Schieser
John F. Kelley

BY

ATTORNEYS.

Fig 10

INVENTORS.
Warren J. Schieser
John F. Kelley
BY

ATTORNEYS.

United States Patent Office 2,736,922
Patented Mar. 6, 1956

2,736,922

INJECTION MOLDING MACHINE WITH AUTO-
MATICALLY-CONTROLLED WEIGH-FEEDER

Warren J. Schieser and John F. Kelley, Columbus, Ohio,
assignors to The Exact Weight Scale Company, Co-
lumbus, Ohio, a corporation of Ohio Application December 24, 1953, Serial No. 400,168

24 Claims. (Cl. 18—30)

Our invention relates to an injection molding machine with automatically-controlled weigh-feeder. It has to do, more specifically, with an injection molding machine for molding plastic materials which is provided with a weigh-feeder that is automatically controlled by the injection molding apparatus of the machine.

The practice of weigh-feeding the charge of plastic molding material to an injection molding machine has become widely accepted and several advantages over the previously-used system of volume-measuring the charge are realized. These advantages are outlined in various current scientific papers and technical bulletins and since they are so widely accepted, they need not be discussed in detail herein.

With plastic injection molding machines used at present, generally speaking, the manner of injecting the shot or charge of plastic molding material into the die or mold is by one of two systems which are described as starved-feeding, or cushion-feeding the die or mold.

Starved-feeding may be described as the system in which the exact amount of plastic molding material required to fill the die or mold is fed to the molding machine feed chamber ahead of the ram of the machine. The ram, which is usually operated hydraulically, then forces the shot or charge into the die or mold via the plasticizer or heat chamber. In so doing, the ram operates to the limit of its stroke, the limit being determined by a mechanical stop. A ram operating in this manner is said to be bottoming.

Cushion-feeding differs from starved-feeding in that the ram does not bottom, due to an excess amount of molding material purposely provided ahead of the ram. The excess of molding material cannot be forced into the die or mold and, therefore, serves as a cushion for the ram as it reaches the extent of its injection stroke.

Whether the ram of an injection molding machine is to be starved-fed or cushion-fed, depends upon many things, such as the type of plastic molding material being used, the type of die or mold, the type of press, and the judgment of the molder. It is quite generally agreed that, regardless of whether the die is starved-fed or cushion-fed, weigh-feeding an exact amount of plastic molding material to the feed chamber of the ram for subsequent feeding to the die is desirable, and in many cases essential, in order to maintain control of the ram to keep it bottoming when starved-feeding to the die or to maintain a uniform cushion ahead of the ram when cushion-feeding to the die.

It will be understood that if a charge of plastic molding material is delivered to the ram and is light in weight, this will cause a short shot, that is an unfilled die, or will cause a decreased cushion, depending upon the method of feeding the die. If the quantity of plastic molding material delivered to the ram is heavy in weight, it could prevent the ram from bottoming or increase the cushion to an undesirable extent, depending upon the method of feeding the die. The results of varying the charge of plastic molding material delivered to the ram might cause the above conditions to occur quickly or over a long period of time, depending upon the degree of error in each delivered charge, and other factors described below.

Factors, other than variation in the charge of the plastic molding material delivered to the ram, can cause improper bottoming of the ram or changes in size of the cushion. For example, these may be: variations in hydraulic pressure driving the ram; variations in temperature that would affect the degree of plasticizing of the material supplied to the ram and would alter resistance to flow of the material into the die; variations in the time cycle during which pressure is applied to the ram; and variations in over-all cycle time caused by the operator.

Since the variables described above do exist, there is a need for a weigh-feeder in an injection molding machine which not only weighs each charge and supplies it to the ram but which will be automatically adjusted by operation of the ram to compensate for these variables so as to eliminate the undesirable effects on the ram position caused by all of the aforementioned variables.

It is one object of our invention to provide a simple, efficient and positive weigh-feeding means in an injection molding machine which is automatically actuated by the ram of the machine to supply accurately weighed charges of molding material to the ram at the proper instants.

Another object of our invention is to provide weigh-feeding means of the type indicated above in an injection molding machine which not only supplies each successively weighed charge at the proper instant, but automatically varies such successive charges under the control of the ram and in accordance with the variables mentioned above.

According to our invention, we provide a weigh-feeder in an injection molding machine which will automatically weigh a predetermined charge of material for feeding to the ram of the molding apparatus. Means is provided in association with the ram for automatically actuating control mechanism on the weigh-feeder which will control feeding of the weighed charge to the ram at the proper instant. Also, means is provided in association with the ram for automatically actuating control mechanism on the weigh-feeder which will vary the amount of material supplied in successive charges in accordance with the variable positions the ram might take at the end of successive injection strokes due to the variable factors discussed above.

Several embodiments of our invention are illustrated in the accompanying drawings wherein similar characters of reference designate corresponding parts and wherein.

Figure 1:
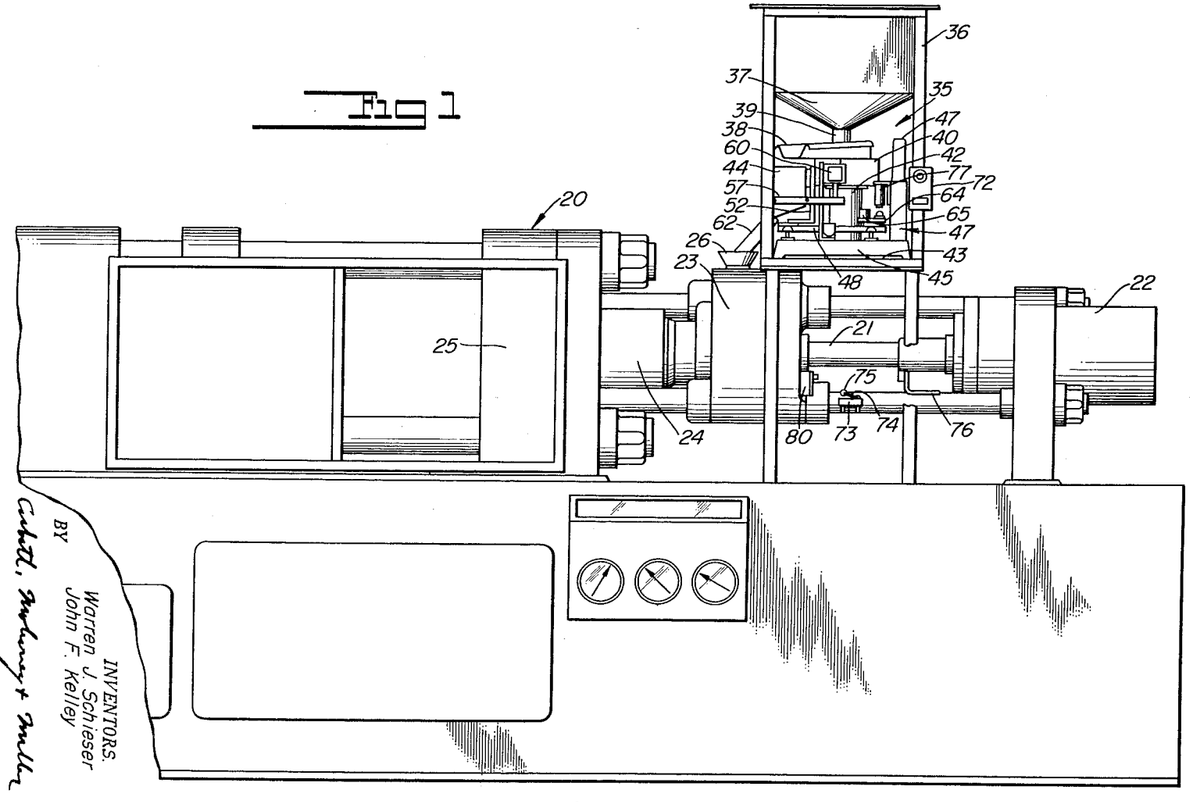
Figure 1 is a side elevational view illustrating an injection molding machine having a weigh-feeder in accordance with our invention.

With reference to the drawings, in Figure 1, we have illustrated our invention embodied in an injection molding press of the horizontal type but it is to be understood that it could be embodied in a press of the vertical type.

Our invention is not limited to any special make of press but is applicable to any press wherein there is provided a ram structure for injecting the molding material into the die or mold.

In the press shown in Figure 1, the press in general is indicated by the numeral 20. This press includes the ram 21 which is operated by a hydraulic cylinder 22. In the injection or molding operation, the ram 21 is moved forwardly through a feed section 23 and through a heating or plasticizing section 24, to force the plastic molding material ahead of it into a mold or die section 25. This section 25 will contain a suitable single cavity or set of die cavities into which the ram 21 will force the plasticized molding charge which has been previously fed to the ram in granular form through an inlet funnel 26 on the section 23.

Figure 4:
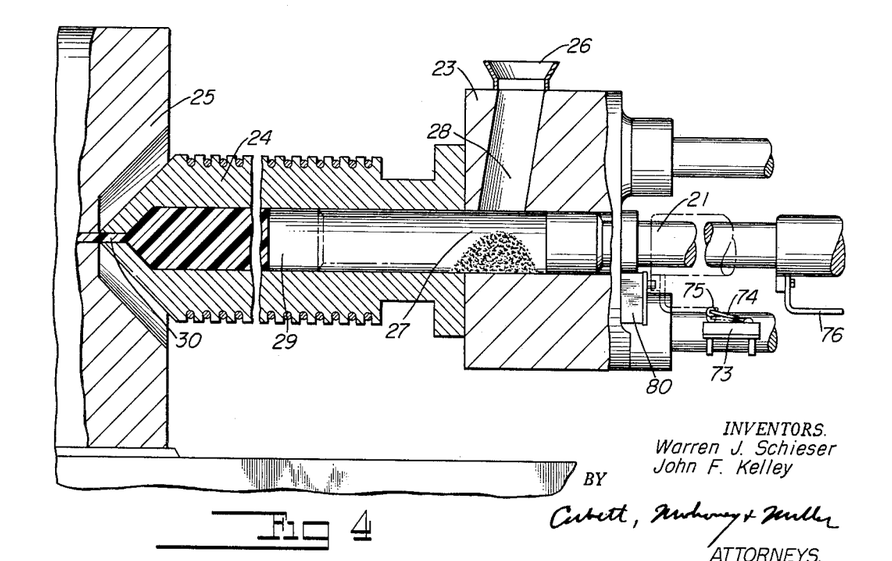
Figure 4 is a longitudinal schematic section through the ram and associated feeding and heating chambers illustrating the switches provided on the ram for controlling the supply of successive charges to the ram and the weight of such successive charges.

As shown in Figure 4, the funnel 26 directs the granular plastic material into a feed chamber 27 through the inlet slot 28 in the top thereof. The ram 21, when projected forwardly, will completely close this inlet slot after moving the previously supplied charge of material forwardly into the plasticizing chamber 29, provided in section 24, where it is gradually heated and melted as it passes through the chamber and before it reaches the nozzle 30 where it is injected into one or more mold cavities in the section 25 by the forward movement of the ram 21. When the ram 21 is retracted rearwardly to the limit of its movement, the forward end of the ram will be behind the inlet opening 28 and a charge of material, previously dumped into the funnel 26, can then drop in front of the ram for subsequent forward movement through the feed chamber 27, the plasticizing chamber 29, and into the die cavity or cavities. It will be noted that the press 20 is so constructed that a portion of the ram 21 lying between the cylinder 22 and the feed section 23 of the press is always exposed.

For automatically supplying successive charges of the plastic molding material to the funnel 26, we provide the weigh-feeder 35. This weigh-feeder 35 is supported by a suitable vertical framework 36 which is attached to the frame of the press 20 in such a location that the weigh-feeder will feed successively weighed charges of material into the funnel 26.

Figures 2, 3:
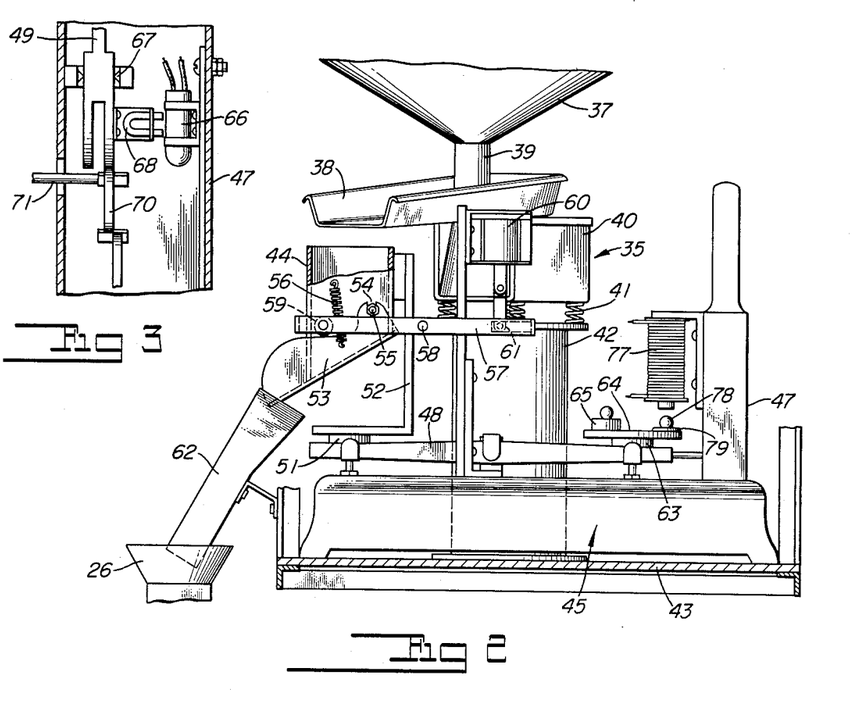
Figure 2 is a side elevational view, partly broken away, of the weigh-feeder having an automatically-controlled weight-compensating device thereon.
Figure 3 is a vertical sectional view through the lower portion of the indicator tower of the weighing scale of the weigh-feeder showing the lower end of the indicator and the associated vibratory-feeder switch which it controls.
Figure 5:
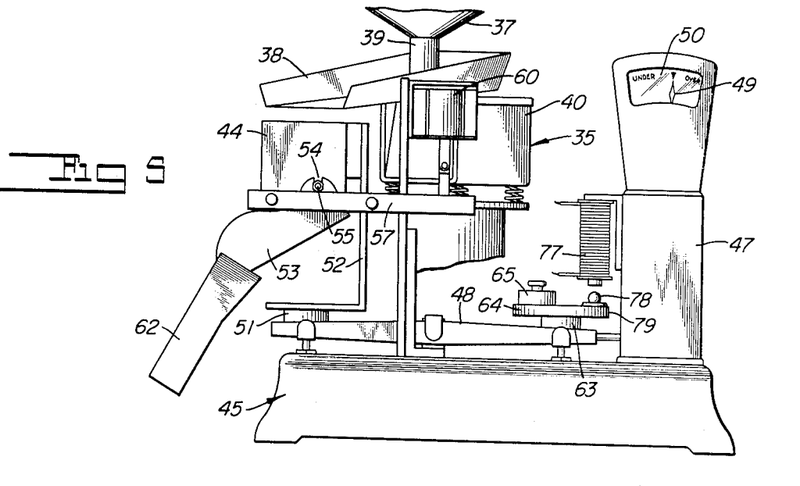
Figure 5 is a schematic view illustrating the weigh-feeder with one type of weight-compensating device on the weighing scale thereof wherein the compensating weight is applied to or removed from the weight platter by means of an electromagnet.

The structure of the weigh-feeder 35 is shown best in Figures 1, 2 and 5 and includes the material hopper 37 which is rigidly supported by the frame 36 (Figure 1). Below this hopper is a vibratory feed trough 38 and into which the hopper discharges through the outlet nozzle 39, the end of which is disposed close to the bottom of the trough so that the material will feed slowly from the hopper into the trough. The trough 38 is carried by a vibratory-feeder 40 which is of the well-known electro-magnetically operated type. This feeder 40 is carried by springs 41 (Figure 2) on the upper end of a standard 42 which rests on a horizontal supporting shelf 43 which is carried by the framework 36 at a level above the ram 21. The manner in which the vibratory-feeder 40 is controlled will be described later.

The vibratory feed trough 38 discharges into the weigh bucket 44 of a scale 45, shown in Figures 1, 2 and 5, and preferably of the over-and-under weight type. This scale 45 includes a base which rests on the shelf 43 and is suitably attached thereto and an indicator tower 47 at one end thereof. On the base of the scale 45 there is fulcrumed an even-balance beam or lever 48 which is connected through suitable mechanism (not shown) to the over-and-under pointer 49, shown in Figure 5, which is associated with an over-and-under dial 50 in the upper portion of the tower 47. In actual practice, the dial and housing is disposed transversely of the press as shown in Figure 1 but is shown facing the observer in Figure 6 for the purpose of illustration.

The weigh bucket 44 is carried on the commodity outrider 51 of the scale by means of the rigid upstanding bracket 52 so that its upper open end is located directly below the discharge end of the vibratory feed trough 38.

The lower open-end of the bucket 44 has a trough-shaped gate 53 mounted for vertical swinging movement relative thereto between bucket-closing and dumping positions. The inner end of the gate 53 straddles the bucket 44 and has upwardly opening notches 54 which cooperate with the trunnion pins 55 on the sides of the gate. The notches 54 make it possible to adjust the gate relative to the pins 55 and the gate is fixed in position relative to the notches by clamping nut units. The gate 53 is normally held in its uppermost or bucket-closing position against the lower end of the bucket 44 by means of a tension spring 56 which has its upper end anchored to the bucket 44 and its lower end connected to the gate 53. The gate 53 is moved into dumping position by means of a yoke 75 which straddles the bucket and gate and which is pivoted for vertical swinging movement at 58 to the upstanding bracket 52. The outer end of the yoke 57 carries the rollers 59 which are normally spaced above the edges of the gate but which engage such edges when the outer end of the yoke is moved downwardly. The yoke 57 is swung vertically by means of a dump solenoid 60 connected to the inner end of the yoke 57 by a sliding pivotal connection 61. The gate 53 is moved to dumping position by energizing the solenoid 60 which will lift the inner end of yoke 57 and will cause the rollers 59 to engage the gate and swing it downwardly so that the charge of material weighed in the bucket 44 will discharge through a directing chute 62 into the funnel 26. The chute 62 is attached to the frame 36 between the gate 53 and the funnel 26 and is so positioned as not to interfere with the weighing operation of the scale 45.

The other outrider 63 of the weighing beam 48 carries the weight platter 64 which is adapted to receive a fixed counterweight 65 of a preselected amount to provide for the desired weight of the charge to be accumulated in the bucket 44.

The vibratory-feeder 40 is controlled by means of a mercury switch 66 which is provided in the lower end of the tower 47 as shown in Figure 3. The switch 66 is of the mercury type which is actuated electromagnetically by a magnet moved adjacent thereto. The switch 66 is fastened to the side of the tower 47, as shown in Figure 3. The lower end of the pointer 49, which is of the pendulum type carried by pivots 67, carries an electromagnet 68. This magnet 68 moves in a transverse plane, closely adjacent the switch 66, in accordance with the transverse swinging of the pointer 49. The pointer 49 and the beam 48 are biased towards correct weight or balanced position, from an underweight position, by means of the set of flexes 70 provided in the tower 47 below an extension 71 of the beam which extends into the tower. The magnet 68 is so located that when the scale beam 48 and the pointer 49 move to correct weight position, the switch 66 opens. This switch 66 will control the vibratory-feeder 40, as will later appear, to cause it to vibrate the feed-trough 38 as long as the material in the bucket is underweight and the beam 48 and pointer 49 move towards correct weight position, but to interrupt vibration thereof when the material in the bucket 44 is sufficient to bring the scale into balance. The switch 66 is included in a circuit which will be described later and some of the elements of this circuit are included in a box 72 (Figure 1) which is mounted on the frame 36.

The dump solenoid 69 is controlled by means of a dump switch 73 which is associated with the ram 21 as shown in Figures 1 and 4. This dump switch 73 is normally open, but is closed each time the ram 21 moves forwardly into the injecting position. The dump switch 73 is mounted in a fixed position on the press below the ram 21 and adjacent the feed section 23 and includes a pivoted actuating lever 74, which normally swings upwardly and which carries a roller 75 on its free end. When the ram 21 moves forwardly into injection position, the roller 75 is engaged by the horizontal part of an L-shaped cam arm 76 carried by the ram between the cylinder 22 and feed section 23. The arm 76 is at the proper level so that its horizontal portion will engage the roller 75 on the lever 74 and force it downwardly when the ram 21 moves forwardly. The arm 76 is so located on the ram and its horizontal arm is elongated so that the forward position of the ram 21 can vary within the limits of the length of the horizontal portion of the arm 76 and still close the switch 73.

The weight-compensating unit on the weigh-feeder 35 may take various forms but in Figures 1, 2 and 5, we have illustrated it as being an electromagnet unit 77. This magnet 77, when energized, will lift a compensating weight, in the form of a steel ball 78, from a pocket 79 on the weight platter 64 in which it will rest whenever the magnet 77 is deenergized. The magnet 77, as will later appear, is controlled by a normally open pushbutton limit switch 80 which, as shown in Figures 1 and 4, is mounted on the feed section 23 of the press in position to be engaged by the vertical portion of the arm 76 when the ram 21 moves sufficiently forwardly during its injection stroke. Thus, forward movement of the ram 21 for the injection operation will not only actuate the dump switch 73, but also, if it moves far enough, will actuate the limit switch 80, as indicated by the dotted lines in Figure 4.

The electromagnet 77 will be energized or deenergized depending upon the extent of the forward movement of the ram 21. If there is a sufficient cushion ahead of the ram on its injection stroke, the normally open limit switch 80 will not be closed and, consequently, at this time, the magnet 77 will be energized and the compensating ball weight 78 will be lifted from the platter 64, so that this weight will not be included with the fixed weight 65 which will counterbalance the charge accumulated in the bucket 44 in the next weighing operation. However, if the cushion is insufficient, the ram 21 will move so far forwardly that the limit switch 80 will be closed, and the magnet 77 will be deenergized, dropping the ball weight 78 into the pocket 79 in the platter 64. Then this weight 78 is added to the weight 65 in counterbalancing the accumulation of the next charge in the bucket 44 which will mean that there will be more material in such charge. It will be noted that magnet 77 is so located as not to interfere with the proper vertical movement of the weight platter 64 during the weighing operation.

When this type of weight-compensating unit is on a weigh-feeder that is used on an injection press of the type employing cushion-feeding, the scale 45 is previously adjusted to deliver a pre-established charge substantially equal to a quantity required for one shot of the press, this usually including the quantity required to fill the die cavity or cavities plus the sprues and the runners. The fixed counterweight 65 will be selected to be slightly less than this quantity while the compensating weight 78 will preferably be of such a value that it, plus the weight 65, will be slightly in excess of the weight of the charge required for all the die cavity or cavities. Instead of the weight 65, a movable poise weight could be employed on the scale in the well-known manner.

When placed in automatic operation, the limit switch 80 will serve as the control point from which weight adjustments will be made. The switch 80 will be actuated when the ram 21 moves forward on a smaller cushion, and the electromagnet 72 will be deenergized to add the removable weight 78, thus increasing the next charge. If the ram moves forward on a larger cushion, the limit switch 80 will not be actuated and the electromagnet 72 will pick up the removable weight 78 and the succeeding charge will be decreased. The system, as described, will tend to continuously correct about a given point established by location of the limit switch 80 in relation to the ram 21. The removable compensating weight 78 represents a very small portion of the total charge, thus maintaining very close and accurate control.

When the automatic weight-compensating system is applied to a molding machine operated with ram-bottoming, it can function in essentially the same manner except that the limit switch 80 will be located so that a very slight cushion of, for example .001 inch, will effect a weight correction that will again cause the ram to bottom on succeeding cycles. The control system, when used with ram-bottoming, will not function, when arranged as outlined, until the ram 21 has failed to bottom by at least a small degree, that is, until a slight cushion has been accumulated.

As a specific example of the operation of the compensating system, assume a shot is known to require 325 grams of material, 324 grams of fixed counterweight 65 will be used and a 2 gram removable compensating weight 78 will be applied or removed by the electromagnet 77. The weighing scale will be delivering either 324 grams of material or 326 grams, depending upon whether or not the limit switch 80 is actuated by the ram.

Figures 6, 7, 8, 9:
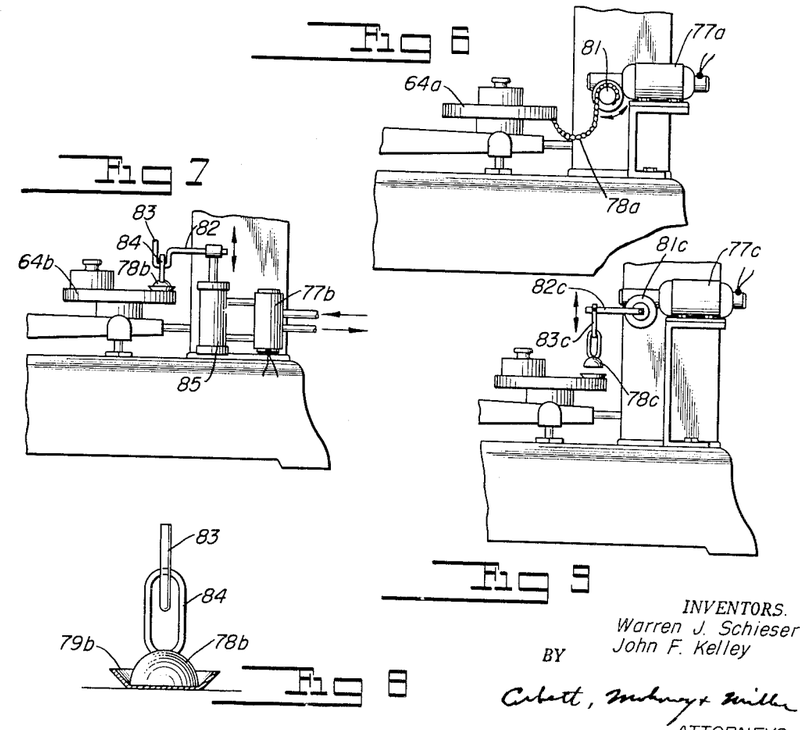
Figure 6 is a schematic view illustrating a device driven by an electric motor for adding or subtracting compensating weight from the weight platter.
Figure 7 is a schematic view illustrating another type of weight-compensating device, wherein the compensating weight is mechanically lifted from or lowered onto the weight platter, the lifting or lowering means being controlled by a fluid-actuated unit.
Figure 8 is a detail of the weight and lifting means.
Figure 9 is a schematic view showing a different means for actuating the mechanical means of Figure 7 for raising or lowering the weight.

In Figure 6, we have illustrated a different arrangement for weight compensation. In this arrangement, a reversible electric motor 77a is mounted adjacent the weight platter 64a. This motor 77a drives a sprocket 81 to which is anchored one end of a compensating weight chain 78a that has its other end attached to the weight platter 64a. The motor 77a will be controlled to wind up the chain 78a on sprocket 81 or to unwind the chain to subtract from or add weight to, respectively, the platter 64a. The chain 78a will not interfere with the necessary vertical movement of the platter 64a.

In Figure 7, we have illustrated another arrangement for weight compensation. In this arrangement, the compensating weight 78b is lifted from or replaced on the weight platter 64b mechanically by means of an arm 82. This arm 82 has a hook 83 on its outer end which cooperates with an upstanding eye 84 on the weight 78b. The hook 83 and eye 84 are so related that with the weight 78b in its pocket 79b on the platter 64b, there will be no contact of these members during the vertical movement of the platter 64b which occurs during the weighing operation. Furthermore, when the weight 78b is lifted from the platter 64b by the arm 82, it will be lifted to such a level that the platter 64b will not contact therewith during the subsequent weighing operation or operations.

The arm 82 is moved vertically by means of a fluid-actuated cylinder and piston unit 85, which may be either hydraulically-operated or air-operated. In either case, it will be controlled by an electromagnetically actuated valve 77b which has the fluid lines 86 and 87 connected thereto and which lead to a suitable source of fluid. The arm 82 could also be moved by a solenoid (not shown) which also could be represented as the unit 85 and in which case the valve 77b would be eliminated.

In Figure 9, we have illustrated different means for raising or lowering the arm 82c to raise or lower the compensating weight 78c. In this instance, the hook 83c is pivotally suspended from the outer end of the arm 82c which is rigidly connected at its inner end to a pinion 81c. This pinion is driven by a reversible electric motor 77c like the motor 77a of Figure 6.

The electric motor 77a, the electromagnetic valve 77b, and the electric motor 77c will each be controlled by the limit switch 80 as will be explained more in detail later.

Figure 10:
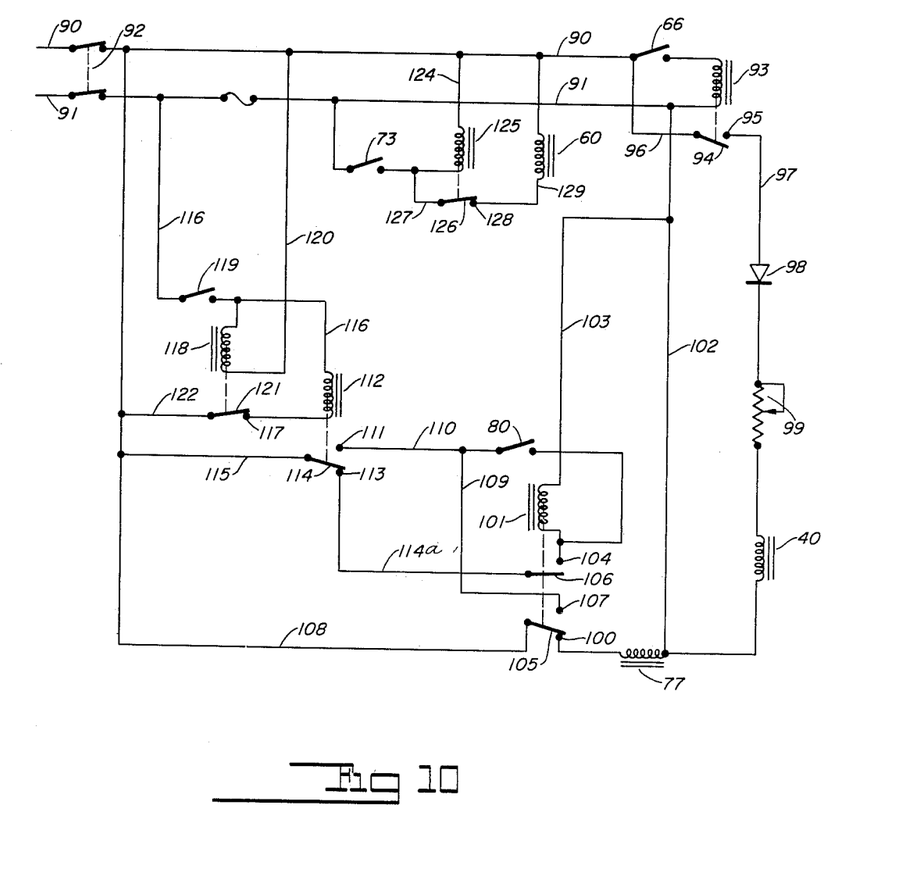
Figure 10 is a circuit diagram of the complete circuit for controlling the means on the weigh-feeder for supplying the charge to the ram and the weight-compensating device thereof, the latter being of the type shown in Figures 2 and 5.

In Figure 10, we have illustrated the electric circuit for controlling the weigh-feeder 35 with the weight-compensating arrangement shown in Figures 1, 2 and 5. The main lines 90 and 91 lead from a suitable source of power and are under the control of a main on-off switch 92. The lines 90 and 91 are connected to the coil of a vibratory feeder control relay 93 which includes a movable contact arm 94 that cooperates with a contact point 95 from which it is spaced with the coil of the relay deenergized. The arm 94 is connected by lead 96 to the movable contact of the mercury switch 66 which controls the vibratory feeder 40. When switch 66 is open, the coil of relay 93 is deenergized, as shown, and when it is closed, the coil of the relay is energized.

The relay contact point 95 is connected by the line 97 in series to a rectifier 98, a rheostat 99, the coil of the magnet of the vibratory feeder 40, the coil of the weight-lifting magnet 77, and the contact point 100 of a relay 101 which controls the weight lifting magnet 77. A line 102 connects to the line 97 and to the main line 91 between the elements 40 and 77. A line 103 connects to the line 102 and to the contact point 104 of the relay 101, the coil of the relay being connected in this line 103. The relay 101 also includes the ganged movable contact arms 105 and 106. With the coil of the relay 101 deenergized, as shown, the arm 106 is spaced from the point 104 and the arm 105 is in contact with the point 100 and spaced from another relay contact point 107. The arm 105 is connected by a line 108 to the main line 90. The contact point 107 is connected by a lead 109 to a lead 110 which connects to the line 103 between the coil of the relay 101 and the contact point 104. Connected in the lead 110, between its points of connection to the line 103 and the lead 109, is the normally-open ram-operated limit switch 80. The lead 110 also connects to the contact point 111 of a relay 112. This relay also includes a contact point 113 which is connected by a lead 114a to the arm 106 of the relay 101. The relay 112 also includes a movable contact arm 114 which is connected by a lead 115 to the line 108. When the coil of the relay 112 is deenergized, the arm 114 of the relay is in contact with the point 113 and is spaced from the point 111. The coil of the relay 112 is connected in a line 116 which leads from a point 117 of a relay 118 to a timer switch 119 and then to the main line 91.

The timer switch 119 is the usual timer switch provided on the press 20 known as the "injection hold" timer for holding the ram in injecting position for a predetermined time and closes when the ram is to return. This switch 119 controls the supply of current to both the coil of the relay 112 and the coil of the relay 118, the latter being connected in a line 120 running from the line 116 to the main line 90. The relay 118 includes a movable contact arm 121 which is connected to the line 108 by a lead 122 and which, when switch 119 is open and the coil of relay 118 is deenergized, is in contact with the point 117. At this time, the coil of the relay 112 is also deenergized and the arm 114 thereof is in contact with the point 113. The ram-operated dump switch 73 is connected in series in the line 124 with the coil of a time-delay relay 125, the line 124 bridging the main lines 90 and 91. The time-delay relay 125 includes a movable contact arm 126 which is connected to the line 124, between the switch 73 and the coil of the relay 125, by a lead 127. The relay 125 also includes a contact point 128 which is connected to a line 129 that connects to the main line 90 and in this line 129 there is connected the coil of the dump-solenoid 60. The contacts of the relay 93 duplicate the action of the mercury switch 66 and the relay is used only to increase the life of the switch 66 since it will have a greater current carrying capacity than the switch.

It will be apparent from Figure 10 that each time the mercury switch 66 is closed, the relay 93 will be actuated to energize the magnet of the vibratory-feeder 40 and cause material to feed into bucket 44. Switch 66 will be closed, as previously indicated, whenever the scale 45 is in underweight condition and will be opened whenever it reaches correct weight condition to interrupt the feed of material. The dump switch 73 is normally open but will be mechanically closed upon each forward stroke of the ram, as previously described. However, the dump switch could be located to operate on the return stroke. This will supply current through contacts 126 and 128 to the dump-solenoid 60 which will energize it and cause it to open gate 53, so that the charge weighed in the bucket 44 will be supplied to the funnel 26 of the press 20. Also, when switch 73 is closed, current is supplied to the coil of the time-delay relay 125 and timing of the relay starts. When the relay times out, the arm 126 swings away from the point 128 and the supply of current to the solenoid 60 is interrupted. Thus, the gate 53 will be closed, allowing the scale 45 to assume underweight condition and the vibratory-feeder will again be operated. This will happen even while the ram 21 is still in its injecting or forward position.

The contacts of an injection-hold timing relay 119 are provided on the usual injection molding press and control the length of time the ram stays forward. They close when the ram is to return. When they close, if the limit switch 80 has not been closed by the movement of the ram 21 forwardly to a predetermined extent as previously described, the relay 101 will not be actuated. Therefore, the magnet 77 will remain energized through the contact arm 105 and the point 100, and will hold the compensating weight 78 off the weight platter 64 so that the next charge of material weighed by the scale 45 will not be increased in weight. However, if the limit switch 80 has been closed by forward movement of the ram 21, the relay 101 will be energized so that the contact arm 105 will be separated from the point 100, deenergizing the magnet 77 and permitting the weight 78 to be added to the weight platter 64, with the result that the next charge weighed will be of increased weight. Thus, the contacts 119 of the time-delay relay, which closes when the ram 21 is to return, operates the relay 112 which, in turn, determines whether the weight 78 is to be lifted or dropped. This determination is made at the extreme forward stroke of the ram, just before it returns. The relay 112 operates momentarily to measure, in effect, the forward position of the ram 21. The condition of the weight-lifting magnet 77 is subject to change only during the short interval that the relay 112 is energized, and will either stay energized with the weight 78 lifted, or will be deenergized to drop the weight. The time-delay relay 118 is actuated by the timing relay contacts 119 to effect momentary operation of the relay 112 regardless of the closed interval of the switch 119. Providing switch 80 is closed, the relay 101 will remain energized through its contacts 105 and 107 during the time the arm 114 of the relay 112 is completing its excursion from the contact point 111 to the contact point 113. This relay 101 will remain energized through its contacts 106 and 104 regardless of subsequent opening of the limit switch 80. Thus, the magnet 77 will be controlled automatically, in each forward stroke of the ram 21 to apply the compensating weight 78 to the scale platter 64 or to remove it therefrom. This will, in turn, control the weight of the subsequent charge of material weighed by the scale 45.

If the weight-compensating arrangement of Figure 7 is used, the magnet of valve 77b will be controlled by the circuit of Figure 10 in the same manner as the magnet 77. The magnet will normally be energized to hold the valve open and, therefore, keep the arm 82 and the weight 78b raised, but will be deenergized when the limit switch 80 closes, to open the valve and allow the arm 82 to move downwardly to lower the weight 78b onto platter 64b.

Figure 11:
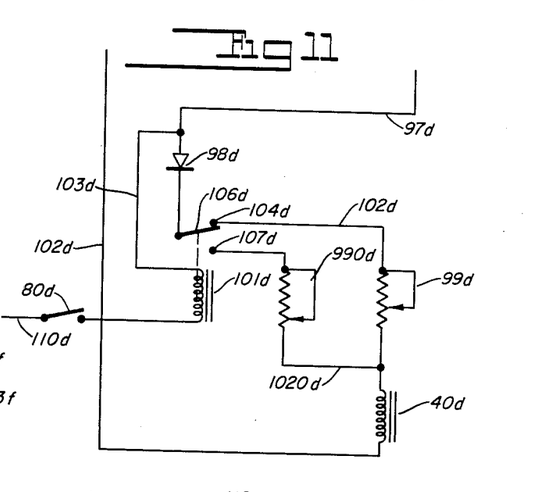
Figure 11 is a diagram of a portion of an electric circuit which may be substituted for the weight-compensating portion of the circuit of Figure 10.

In Figure 11, we have illustrated a different arrangement for obtaining a compensating effect by a variation in the resistance of the circuit which controls the magnet of the vibratory-feeder. The portion of the circuit shown in Figure 11 will take the place of the portion of the circuit of Figure 10 which controls the weight-lifting magnet 77. The line 97d will connect to the relay 93 and the mercury switch 66 of Figure 10 which control the supply of current from the main line 90. The line 102d will connect to the other main line 91. The line 97d has the rectifier 98d connected therein and connects to an arm 106d of the compensating relay 101d. Energization of the coil of the relay 101d is controlled by the limit switch 80d which is connected to the line 110d that is controlled by the relay 112 of Figure 10. The relay 101d also includes the pair of spaced contact points 104d and 107d, associated with the arm 106d. When the coil of relay 101d is deenergized, as shown, the arm 106d contacts with the point 104d and is spaced from the point 107d. The point 104d is connected to the line 102d which has the adjustable resistance 99d and the coil of the vibratory-feeder 40d therein. The point 107d is connected by the line 1020d to the line 102d, between the resistance 99d and the coil of the vibratory-feeder 40d, and connected in the line 1020d is another adjustable resistance 990d.

When the limit switch 80d is open, the vibratory-feeder 40d will be energized through the resistance 99d. When the switch 80d is closed, the relay 101d will be actuated to switch the contact arm 106d from the point 104d to the point 107d and the feeder will now be energized through the resistance 990d. This resistance will be set to offer less resistance than resistance 99d and, therefore, the vibratory-feeder 40d will feed faster and more material will be supplied in the next charge. With this arrangement only the fixed weight 65 will be used and the weight compensation in succeeding charges will occur by automatically switching the control of the vibratory-feeder 40d back and forth, as required, between the resistances 990d and 99d. With the arrangement shown in Figure 11, compensation takes place by varying the quantity of material in suspension between the feeder and the scale. It will be apparent that adjustment of the operating point of switch 66, with relation to the scale dial 50, takes into account the quantity of material in suspension (commonly called suspension column) between the feeder trough 38 and the scale bucket 44, for a given rate of feed. Increasing the rate of feed increases material in suspension, and thus the scale balances overweight. Decreasing the rate of feed decreases the material in suspension and thus the scale balances underweight.

Figure 12:
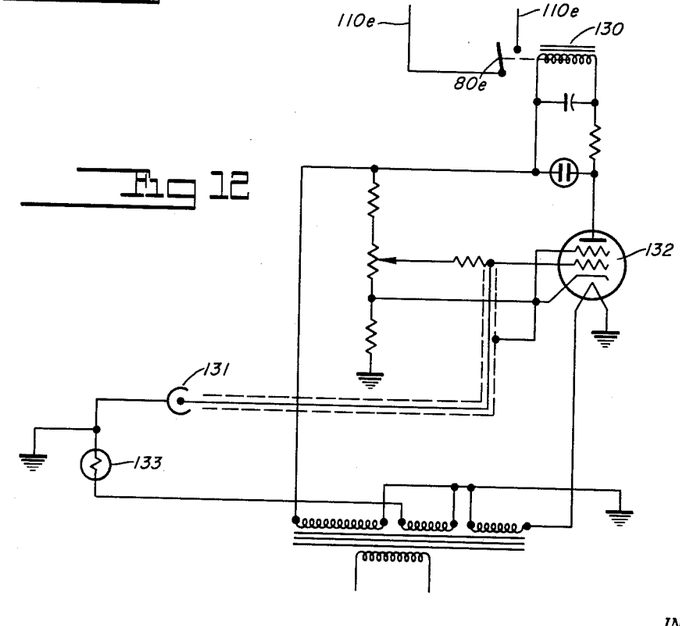
Figure 12 is a diagram of a photoelectric circuit which may be substituted for the limit switch of the circuit of Figure 10.
Figure 13:
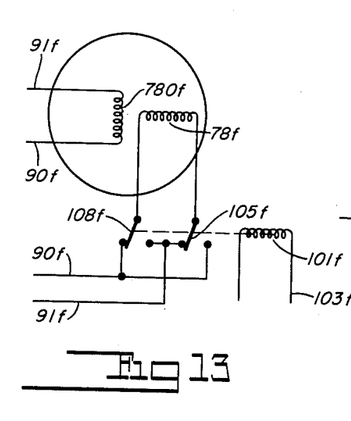
Figure 13 is a diagram of a portion of the circuit used in controlling the reversible motor of Figure 6 or Figure 9.

In Figure 12, we have illustrated a photoelectric circuit arrangement to take the place of the mechanically actuated limit switch 80. This circuit controls the relay 130 which actuates the switch 80e which is disposed in line 110e, corresponding to line 110 of Figure 10. The relay 130 is controlled by the phototube 131 which has the amplifying tube 132 and associated circuit connected thereto. The light beam for the phototube 131 is supplied by a lamp 133 connected in the circuit. The tube 131 and the light source 133 will be so located relative to the ram 21 that the light beam will be broken to close the switch 80e by a flag (not shown) carried by the arm 76 whenever the ram moves forwardly into injecting position to a predetermined extent. The photoelectric circuit may also be substituted, in an obvious manner, for the vibratory-feed control mercury switch 66, in which case, the switch 66 will be controlled by the relay 130 and the light beam will be broken by a flag (not shown) carried by the pointer 49 or the beam 48 which will break the light beam to close the switch 66 whenever the scale beam and pointer are in underweight position.

When the circuit of Figure 10 is used for controlling the reversing motor 77a of Figure 6 or the reversing motor 77c of Figure 9 additional circuit elements will be required. Instead of one magnet coil 77 there will be a reversible motor with coils 78f and 780f. A relay 101f will control reversing of the flow of current through the coil 78f by actuating the switches 105f and 106f. The coil of this relay 101f will be connected in a line 103f, corresponding to line 103 of Figure 10. The contact points of switches 105f and 106f and the coil 780f will be connected to the main lines 90f and 91f as indicated. The motor is of a type that can be stalled while energized. Thus, it operates between two mechanical limit stops.

It will be apparent from the above that we have provided an injection molding machine with a weigh-feeder which not only weighs each charge and supplies it to the ram automatically in accordance with operation of the ram but which will be adjusted automatically by operation of the ram to compensate for variations in the quantity of plastic material required by the molding machine. The weigh-feeder is simple, efficient and is completely automatic.

Various other advantages will be apparent.

Having thus described our invention, what we claim is:

1. An injection molding machine having a ram movable between injecting and non-injecting positions, a weigh-feeder for supplying weighed-charges to the ram, and means for controlling the weight of successive charges in accordance with the injecting position of said ram.

2. An injection molding machine having a ram reciprocable between injecting and non-injecting positions, a weigh-feeder for supplying weighed charges successively to the ram, and means for measuring the position of the ram as it approaches the end of its injecting stroke, and compensating means controlled by the position of the ram as it completes its injecting stroke for automatically controlling the weight of successive charges supplied to the ram by the weigh feeder.

3. An injection molding machine having a ram reciprocable between injecting and non-injecting positions, a weigh-feeder for weighing predetermined charges of molding material, means actuated by the ram for successively supplying the weighed charges from the weigh-feeder to the ram, and compensating means controlled by the position of the ram as it completes its injecting stroke for automatically controlling the weight of successive charges weighed by said weigh-feeder.

4. An injection molding machine having a ram reciprocable between injecting and non-injecting positions, a weigh-feeder for weighing predetermined charges of molding material, said weigh-feeder comprising a weighing scale, means actuated by the scale for feeding material to the weighing scale to cause the scale to weigh a predetermined charge, means actuated by the ram for successively supplying the weighed charges from the scale to the ram, and compensating means controlled by the position of the ram as it completes its injecting stroke for automatically controlling said feeding means to control the weight of successive charges weighed on said scale.

5. An injection molding machine according to claim 4 in which said means for supplying the charges from the scale to the ram includes an electromagnetic unit, and a switch actuated by the ram for controlling said electromagnetic unit.

6. An injection molding machine according to claim 5 in which said material feeding means is electromagnetically operated, and a switch operated by said scale for controlling said electromagnetically operated feeding means.

7. An injection molding machine according to claim 6 in which said compensating means is electrically operated, and a limit switch actuated by the ram for controlling said compensating means.

8. An injection molding machine according to claim 7 in which the switch for controlling supplying of charges to the ram is disposed adjacent the path of travel of the ram and a member is provided on the ram for engaging said switch during each reciprocating cycle of the ram, said switch for controlling said compensating means being so supported that it is engaged by said member only when the ram moves to a predetermined extent in its injecting stroke.

9. An injection molding machine according to claim 7 in which said compensating means includes a unit for applying to the scale or removing therefrom a compensating counterweight so as to control the amount of material fed by said feeding means.

10. An injection molding machine according to claim 9 in which the compensating unit comprises an electromagnet for lifting a compensating weight from the scale or lowering it thereon.

11. An injection molding machine according to claim 9 in which the compensating unit comprises fluid-actuated means for lifting a compensating weight from the scale or lowering it thereon, and an electrically-operated valve for controlling said means.

12. An injection molding machine according to claim 9 in which the compensating unit comprises a vertically movable arm for lifting a compensating weight from the scale or lowering it thereon, and a reversible electric motor for moving said arm.

13. An injection molding machine according to claim 9 in which the compensating unit comprises a chain suspended from the scale so as to have a counterweight effect thereon, means for changing the weight effect of the chain on the scale, said means comprising a rotatable member upon which the chain is wound or unwound supported independently of the scale, and a reversible electric motor for rotating said member.

14. An injection molding machine having a ram reciprocable between injecting and non-injecting positions, a weigh-feeder for weighing predetermined charges of molding material, said weigh-feeder comprising a weighing scale, means actuated by the scale for feeding material to the weighing scale to cause the scale to weigh a predetermined charge, means for successively supplying the weighed charges from the scale to the ram, and compensating means controlled by the position of the ram as it completes its injecting stroke for automatically controlling said feeding means to control the weight of successive charges weighed on said scale.

15. An injection molding machine according to claim 14 in which said material feeding means is electromagnetically operated, and a switch operated by said scale for controlling said electromagnetically operated feeding means.

16. An injection molding machine according to claim 15 in which said compensating means is electrically operated, and a limit switch actuated by the ram for controlling said compensating means.

17. An injection molding machine according to claim 16 in which said limit-switch is located along the path of movement of the ram, and means carried by the ram for engaging said switch only when the ram moves to a predetermined extent in its injecting stroke.

18. An injection molding machine according to claim 17 in which said compensating means includes a unit for applying to the scale or removing therefrom a compensating counterweight so as to control the amount of material fed by said feeding means.

19. An injection molding machine according to claim 18 in which the compensating unit comprises an electromagnet for lifting a compensating weight from the scale or lowering it thereon.

20. An injection molding machine according to claim 18 in which the compensating unit comprises fluid-actuated means for lifting a compensating weight from the scale or lowering it thereon, and an electrically-operated valve for controlling said means.

21. An injection molding machine according to claim 18 in which the compensating unit comprises a vertically movable arm for lifting a compensating weight from the scale or lowering it thereon, and a reversible electric motor for moving said arm.

22. An injection molding machine according to claim 18 in which the compensating unit comprises a chain suspended from the scale, and means for changing the weight effect of the chain in the scale, said means comprising a rotatable member upon which the chain is wound or unwound supported independently of the scale, and a reversible electric motor for rotating said member.

23. An injection molding machine having a ram reciprocable between injecting and non-injecting positions, a weigh-feeder for weighing predetermined charges of molding material, said weigh-feeder comprising a weighing scale, means actuated by the scale for feeding material to the weighing scale to cause the scale to weigh a predetermined charge and being electromagnetically operated, a switch operated by said scale for controlling said electromagnetically operated feeding means, means for successively supplying the weighed charges from the scale to the ram, compensating means controlled by the position of the ram as it completes its injection stroke for automatically controlling said feeding means to control the weight of successive charges weighed on said scale, said compensating means including a relay, and a limit switch actuated by the ram and controlling said relay for actuating said compensating means, and timing means for controlling actuation of said relay.

24. An injection molding machine having a ram reciprocable between injecting and non-injecting position, a weigh-feeder for weighing predetermined charges of molding material, said weigh-feeder comprising a weighing scale, means actuated by the scale for feeding material to the weighing scale to cause the scale to weigh a predetermined charge and being electromagnetically operated, a switch operated by said scale for controlling said electromagnetically operated feeding means, means actuated by the ram for successively supplying the weighed charges from the scale to the ram and including an electromagnetic unit, a switch actuated by the ram for controlling said electromagnetic unit, compensating means controlled by the position of the ram as it completes its injecting stroke for automatically controlling said feeding means to control the weight of successive charges weighed on said scale, said compensating means being electrically operated, a limit switch actuated by the ram for controlling said compensating means, and a time delay relay connected between the electromagnetic unit which supplies the charges to the ram and the switch which controls it for breaking the circuit to said unit after a predetermined interval.

References Cited in the file of this patent

UNITED STATES PATENTS

| | | |
|---|---|---|
| 2,235,324 | Moreland | Mar. 18, 1941 |
| 2,291,150 | Demick et al. | July 28, 1942 |
| 2,320,594 | Hempel | June 1, 1943 |
| 2,348,372 | Weckerly | May 9, 1944 |
| 2,627,087 | Hendry | Feb. 3, 1953 |
| 2,678,185 | Howard | May 11, 1954 |